June 18, 1940.                    J. A. TRAYLOR                    2,204,835
                           TROMMEL SCREEN CONSTRUCTION
                          Original Filed Feb. 26, 1936

INVENTOR
JOHN A. TRAYLOR
BY
Harold W. Mattingly
ATTORNEY

Patented June 18, 1940

2,204,835

UNITED STATES PATENT OFFICE 2,204,835

TROMMEL SCREEN CONSTRUCTION

John A. Traylor, Denver, Colo.; Edna T. Eisenhand, Tessie S. Traylor, and John B. Traylor, coexecutors of said John A. Traylor, deceased Original application February 26, 1936, Serial No. 65,933. Divided and this application May 24, 1938, Serial No. 209,708

5 Claims. (Cl. 209—399)

My invention relates to trommel screens and has particular reference to mechanism for rehabilitating existing trommel screens in such manner as to improve their efficiency and particularly the efficiency with which repairs, adjustments and alterations therein may be made.

This application is a division of my copending application for Trommel screen, filed February 26, 1936, Serial No. 65,933, now Patent 2,121,371 issued June 21, 1938.

In trommel screen constructions, it is the common practice to employ a skeleton framework including end rings interconnected by a plurality of longitudinally extending spanners, the spanners being employed to engage the edges of separable arcuate screen plates to form with the skeleton drum a substantially cylindrical screen mechanism which when rotated will screen or separate material introduced into the interior of the drum.

In prior trommel screen constructions, it has been the practice to employ spanner bars extending longitudinally between the end rings, upon which the edges of adjacent screen plates may rest, rivets, bolts or other securing mechanism being passed through the screen plates and through the spanners to hold the plates in place thereon, those portions of the screen plates disposed between adjacent spanners being unsupported so that after a relatively short period of operation, particularly in the handling of heavy materials such as large rock and the like, the pounding of the screen plates by the rock causes bulges and weakened points in the screen plates between the adjacent spanners while the hammering of the rock or other material upon the screen plates tends to pull the screen plates away from the spanners, rapidly wearing the rivets, bolts or other devices which are used to secure the plates to the spanners and frequently shearing these bolts or rivets due to the lateral forces exerted in the screen plates by the pounding of the material thereon. Thus it is necessary after a relatively short period of operation to completely remove some or all of the screen plates from the skeleton drum and replace them with new plates, an operation which requires the cutting of the rivets or removal of the bolts employed to hold the plates to the spanners, and requires considerable time and considerable labor.

Also once the rivets or bolts have been loosened as a result of the operation of the screen, it is substantially impossible to satisfactorily tighten such rivets or bolts and even where it is possible to tighten the same the condition of the screen plates is usually such that their remaining life is scarcely worth the effort and time which must be consumed in tightening the bolts or rivets.

I have observed that in the operation of trommel screens the repeated pounding or hammering of the materials upon the screen plates has a tendency to rapidly loosen any rigid connections which are made between the plates and spanners so that after a relatively short period of operation and long prior to the wearing out of the screen plates, the structure has become so loosened and distorted as to require repair and readjustment of the parts.

It is therefore an object of my invention to provide a ready means for rehabilitating or reconstructing existing trommel screens which will prolong their active life and render them efficient both as to their screening operations and as to the economical replacement of parts.

Another object of my invention is to provide mechanism for reinforcing trommel screens by the employment of clamping devices which may be readily secured upon or removed from the screen structure and which may be readily employed to tighten the screen plates upon the spanners either as an addition to or as a substitute for rivets or bolts passing through the spanners and the screen plates.

Another object of my invention is to provide a reinforcing means for trommel screens comprising bands disposed about the exterior of the screen plates in such manner as to engage the screen plates at a plurality of points between adjacent spanners and which may be employed to draw the screen plates back into their original arcuate shape and to hold the plates in their proper arcuate shape against the pounding forces to which the plates are subjected.

Another object of my invention is to provide reinforcing devices adapted to extend between adjacent spanners and about the exterior of the screen plates disposed between the spanners, junctions being made between the reinforcing devices at the spanners in such manner as to provide clamps at the spanners for engaging and clamping the screen plates to the spanners.

Another object of my invention is to provide a repair attachment which may be employed to repair and rehabilitate trommel screens including a clamp adapted to be disposed over the spanners and tie rods interconnecting the clamps and adjacent spanners and about the exterior surface of the screen plates disposed upon the spanners.

Other objects and advantages of my invention will be apparent from a study of the following specifications, read in connection with the accompanying drawing, wherein Fig. 1 is a side elevational view of a trommel screen constructed in accordance with my invention;

Figure 1:
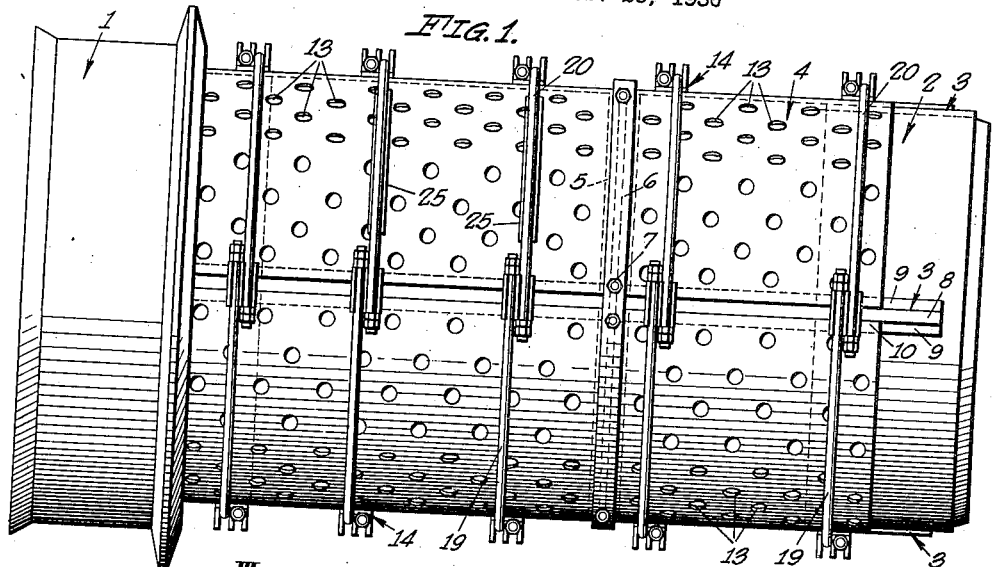

Referring to the drawing, I have illustrated in Fig. 1 a trommel screen comprising essentially a skeleton frame including a pair of end rings or annular heads 1 and 2, interconnected by means of a plurality of spanners 3 which extend longitudinally between the heads 1 and 2 and are spaced at substantially equal intervals about the heads 1 and 2. The spanners may be connected to the heads by means of rivets, bolts or other securing means so that the assembled structure of heads and spanners constitutes a skeleton drum upon which may be secured a plurality of arcuate perforated screen plates 4, each of the screen plates constituting a sector of the outer surface of a cylinder. The arcuate plates may be divided longitudinally, in which case the skeleton drum may be provided with one or more rings or bands 5, upon which the adjacent ends of the plates 4 may rest and to which they may be secured as by means of a clamping strip 6 and bolts 7.

Figure 2:
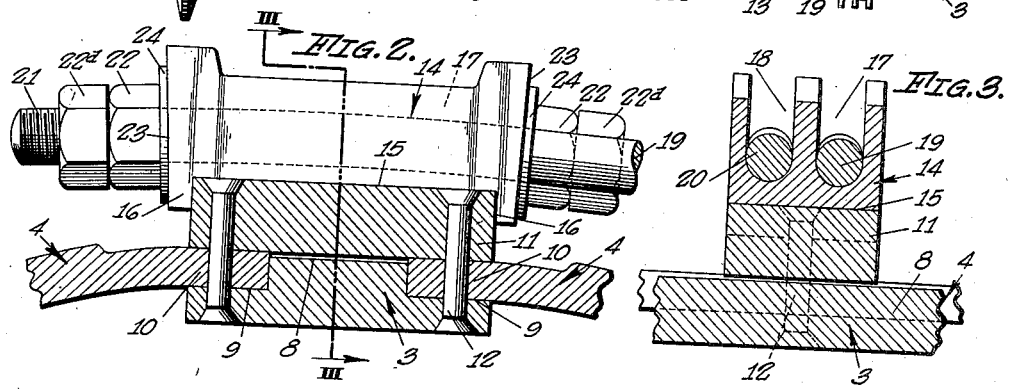
Fig. 2 is a detail vertical sectional view taken through one of the spanners, the screen plates, and illustrating the manner in which my clamps and tie rods may be employed.

By referring particularly to Fig. 2, it will be observed that the usual spanner employed constitutes an elongated bar having a projecting portion 8 extending from one surface thereof to provide recesses 9 upon each side of the spanners 3 into which may be received the side edges 10 of adjacent screen plates 4, each of the screen plates resting upon the upper surface of the recess 9 while the projecting portion 8 of the spanners constitutes an abutment against which the edges of the screen plates may bear and against which they may seat. In certain types of trommel screen constructions, a second strip or bar 11 is provided extending longitudinally of the skeleton drum and disposed above the outer surfaces of the edges of the screen plates 4 so that rivets 12 extending through the bar 10 and the spanner 3 are employed to secure the edges of the screen plates to the spanners.

As will be understood by those skilled in the art, the assembly of the screen plates upon the skeleton drum provides a cylindrical screen into the interior of which material to be screened may be introduced, rotation of the cylindrical screen causing the material therein to be thrown outwardly against the screen plates so that such particles of the material as are sufficiently small to pass through the openings 13 of the screen plates will pass out of the screen while such particles as are too large to pass through the openings will be retained within the drum. The effect of the tumbling of the materials within the drum will be to constantly hammer against the interior surfaces of the screen plates 4 so that the forces exerted thereby will tend to pull the edges 9 of the screen plates laterally away from the spanners 3 and thus tend to rapidly wear or shear the rivets 12. Also the hammering of the material upon the interior of the drum will cause distortion of the screen plates producing bulges in the screen plates which will rapidly become so worn as to render the screen plates unserviceable.

When the screen plates become so worn or bulged or so loosened from the spanners, it is necessary to remove the screen plates 4 and replace them with new plates though frequently the replacement of the plates in place upon the spanner may be dispensed with if some suitable means may be employed for binding or tightening the screen plates upon the spanners.

Figure 3:
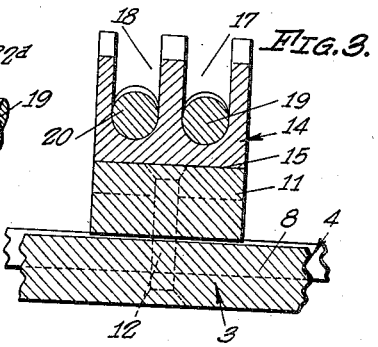
Fig. 3 is a vertical sectional view taken along line III—III of Fig. 2.

I have illustrated in Figs. 1, 2 and 3 hereof a ready means for accomplishing this result for tightening the screen plates upon the screen drum, such mechanism comprising a clamp member 14 having a length somewhat in excess of the width of the spanner 3 and particularly when associated with a bar 11 the clamp 14 should have a length somewhat in excess of the bar. The clamp is illustrated as being substantially rectangular in cross section and is provided upon its lower face with a recess 15, the ends of the clamp 14 at the ends of the recess 15 extending downwardly as indicated at 16 to engage upon opposite side edges of the bar 11 to assist in holding the clamp 14 against lateral displacement.

The upper surface of the clamp 14 is preferably provided with a pair of grooves or openings 17 and 18 through which projects the ends of a pair of tie rods 19 and 20, one of the tie rods extending from the clamp 14 in one direction about the drum while the other of the tie rods 20 extends from the clamp 14 about the drum in the opposite direction. By employing one of the clamps 14 upon each of the spanners, the tie rods interconnecting the clamps will in effect provide a band extending completely about the drum. The ends of the tie rods are threaded as indicated at 21 so as to permit a nut 22 to be screwed thereon into clamping relation with one end of the clamp 14, the end of the clamp 14 being beveled inwardly and downwardly toward the exterior surface of the drum as indicated at 23 in Fig. 2, and a suitable washer 24 may be interposed between the nut 23 and the beveled end of the clamp so that by tightening the nut 22 the tie rod will be drawn downwardly toward the surface of the drum.

By employing the clamps 14 and tie rods 19 and 20, it will be apparent that should the rivets 12 become loosened or sheared the bar 11 will be pressed downwardly into snug engagement with the screen plates 14 by the clamping effect of the tightening of the tie rods 19 and 20. I prefer to employ lock nuts 22a behind each of the nuts 22 to prevent loosening of the nuts 22 under the vibration to which they will be subjected during the normal operation of the screen though it will be understood by those skilled in the art that once the tie rods have been tightened they will act as resilient means interconnecting the clamps 14 associated with adjacent spanners so that a resilient interconnection is provided tending to hold the parts in their adjusted positions as distinguished from a rigid interconnection of the parts.

As will be apparent to those skilled in the art, the placing of the bands comprised by the tie rods 19—20 and their clamps 14 about old trommel screens will draw all of the screen plates 4 tightly against the spanners and will hold them in place irrespective of loosening of the rivets 12 or bolts or other securing devices which may have been originally employed to hold the screen plates in place and once the tie rods and clamps have been placed upon a screen and properly tightened, the structure will remain tightly clamped and assembled until the screen plates have been so worn as to require the entire replacement of one or more of the screen plates.

It will be apparent that the portions of the tie rods 19 and 20 extending between the clamps will be drawn downwardly toward the surface of the screen plates so as to engage and hold these screen plates against outward thrusts exerted upon the screen plates by the pounding of the material within the drum, though I prefer to employ shoes such as those illustrated at 25 interposed between the tie rods and the adjacent surfaces of the screen plates over which they extend.

Figure 4:
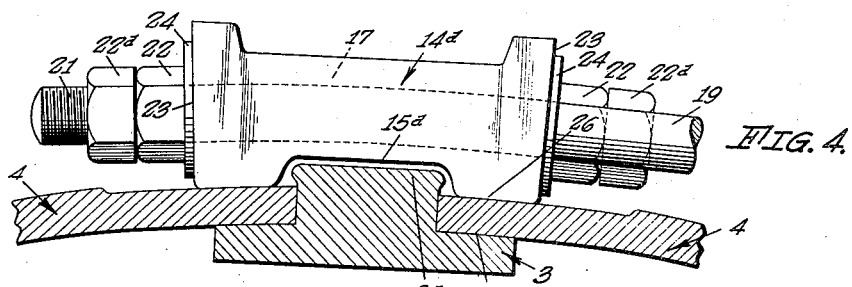
Fig. 4 is a detail sectional view similar to Fig. 2 and illustrating a modified form of clamp which may be employed in the practice of my invention.

In Fig. 4 I have illustrated a modified form of clamp 14a which may be substituted for the clamp 14 as a repair device for screens in which no additional bar 11 is employed above the spanners 3, the clamp 14a having a recess 15a formed upon the lower surface thereof to bridge the projecting portion 8a of the spanner 3 and to provide feet 26 upon opposite sides of the projecting portions 8a adapted to engage and rest upon the edges of the screen plates 4 so as to securely press or clamp the screen plates 4 between the shoes and the shelf-like surface 27 of the spanners 3.

With this form of the device it will be apparent that the tie rods 19 and 20 may be employed in the same manner as described with reference to Figs. 1, 2 and 3 so that the tightening of the nuts 22 upon opposite tie rods will draw the clamp 14a into snug clamping engagement with the screen plates 4.

With the forms of the device illustrated in Figs. 1 through 4, it will be apparent that when a replacement of any of the screen plates is to be made, all that is necessary is to loosen the nuts 24 and 22 upon those tie rods which extend about the particular screen plate 4 to be replaced, the tie rods being then either removed from the clamps 14 or slid along the grooves 17—18 of the clamps to expose the particular plate to be removed. The loosening of the tie rods loosens the clamping effect upon the plates of the clamps 14 or 14a, permitting the ready removal of the screen plates while when the new plates are placed upon the spanners, the tie rods may be replaced in their clamps 14 and 14a and tightened, the effect of the clamps 14 being to securely press or clamp the edges of the screen plates downwardly upon the spanners 3. Upon the replacement of any of the screen plates, it is unnecessary to re-rivet these plates in place, the clamping action of the clamps 14 being thereafter depended upon for securing the plates to the spanners.

Figure 5:
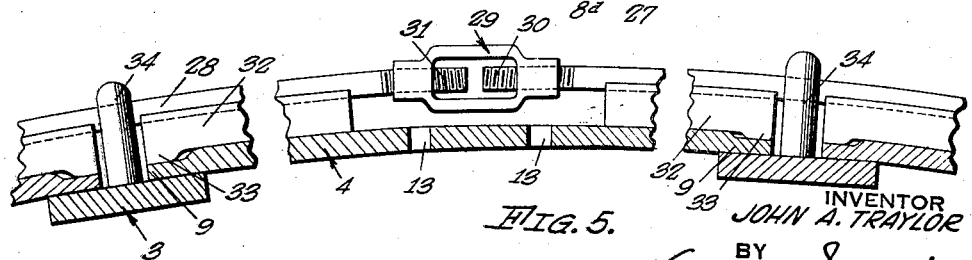
Fig. 5 is a vertical sectional view of a pair of spanners and their associated screen plates and illustrating a still further modified type of clamp and tie rod which may be employed in the practice of my invention.

While the sectional tie rod mechanism formed of rod sections 19 and 20 arranged as shown in Figs. 1 through 4 permits of the ready replacement of individual screen plates, an effective reinforcing of screen constructions employing a one-piece tie rod is illustrated in Fig. 5. A one-piece tie rod 28 is shown as extending completely around the drum, a turnbuckle 29 intercoupling the threaded ends 30 and 31 of the rod 28 in such manner as to permit ready tightening of the tie rod about the drum. Clamping blocks of the type shown in Figs. 1 through 4 may be interposed between the tie rod and the screen plates at each of the spanners to secure the clamping action between the plate edges of the spanners or a special shoe 32 shown in Fig. 5 may be employed, the shoe 32 preferably having a foot 33 formed thereon adapted to engage the edges 9 of the screen plates to exert a clamping pressure upon the edges of the screen plates, tending to press them snugly against the spanners 3. If desired, the spanners 3 may have secured thereto guide members 34 comprising preferably U-shaped clips, the ends of which are welded or bolted to the spanners 3 to form at the bases of the U's a loop through which the tie rod 28 may be threaded.

The clamping shoes 32 preferably extend a considerable distance along the upper surface of the screen plates 3 so as to permit the tightening of the tie rods 28 to exert a clamping or restraining effect upon the portions of the screen plates lying between the spanners to permit the tie rods to resist any bulging effect which might be produced by the pounding of the material within the screen.

It will therefore be observed that I have provided a trommel screen construction wherein clamps and tie rods may be readily disposed about the exterior of the drum to exert clamping forces tending to hold the edges of the screen plates securely in place upon the spanners and in which the intermediate portions of the tie rods or bands employed to exert such clamping forces may also be employed to reinforce the portions of the screen plates disposed between the spanners against outward thrusts exerted by the pounding of the materials within the drum.

While I have shown and described the preferred embodiment of my invention, I do not desire to be limited to any of the details of construction shown or described herein, except as defined in the appended claims.

I claim:

1. In combination with a trommel screen having a skeleton drum including a plurality of spanners distributed in spaced relation about the drum and screen plates extending between the spanners, the spanners having foot portions constituting shelves upon which the edges of adjacent screen plates may rest, means for clamping the plates upon said spanners including a sectional tie rod extending circumferentially about said drum, each section of said tie rod extending between an adjacent pair of said spanners, means for interconnecting adjacent sections of said tie rod comprising a clamping block extending across each of said spanners and interposed between said tie rod sections and the edges of both of the adjacent plates resting upon the spanner, the ends of said clamping blocks disposed on opposite sides of a spanner being beveled inwardly toward the spanner, nuts threaded upon the ends of each of said tie rod sections and bearing upon said beveled ends of said clamping blocks whereby tightening of the nuts upon said rod sections will cause said clamping blocks to be drawn radially toward the foot portions of said spanners to clamp the edges of said plates upon said spanners.

2. In combination with a trommel screen having a skeleton drum including a plurality of spanners distributed in spaced relation about the drum and screen plates extending between the spanners, the spanners having foot portions constituting shelves upon which the edges of adjacent screen plates may rest, means for clamping the plates upon said spanners including a sectional tie rod extending circumferentially about said drum, each section of said tie rod extending between an adjacent pair of said spanners, means for interconnecting adjacent sections of said tie rod comprising a clamping block extending across the spanners and having feet formed thereon resting upon the outer surfaces of both of the plates disposed upon the foot portions of the spanner, nuts threaded upon the ends of said tie rod sections and bearing against the ends of the clamping blocks whereby tightening of the nuts upon said tie rod sections will draw said clamping blocks toward the foot portions of said spanners to clamp the plates upon said spanners.

3. In combination with a trommel screen having a skeleton drum including a plurality of spanners distributed in spaced relation about the drum and screen plates extending between the spanners, the spanners having foot portions constituting shelves upon which the edges of adjacent screen plates may rest, means for clamping the plates upon said spanners including a sectional tie rod extending circumferentially about said drum, each section of said tie rod extending between an adjacent pair of said spanners, means for interconnecting adjacent sections of said tie rod comprising a clamping block extending across the spanner and having a pair of grooves extending therethrough from one end of said block to the other for receiving therein the ends of adjacent tie rods, nuts threaded upon the ends of said tie rod sections and bearing against the ends of the clamping blocks whereby tightening of the nuts upon said tie rod sections will draw said clamping blocks toward the foot portions of said spanners to clamp the plates upon said spanners.

4. In combination with a trommel screen having a skeleton drum including a plurality of spanners distributed in spaced relation about the drum and screen plates extending between the spanners, the spanners having foot portions constituting shelves upon which the edges of adjacent screen plates may rest, means for clamping the plates upon said spanners including means forming a tie rod extending circumferentially about said drum, and clamping blocks interposed between said tie rod means and the outer surface of said plates at each of said spanners, and shoes interposed between said tie rod means and the outer surfaces of said screen plates intermediate adjacent spanners to reinforce the plates between the clamped edges thereof.

5. In combination with a trommel screen having a skeleton drum including a plurality of spanners distributed in spaced relation about the drum and screen plates extending between the spanners, the spanners having foot portions constituting shelves upon which the edges of adjacent screen plates may rest, means for clamping the plates upon said spanners including means forming a tie rod extending circumferentially about said drum, clamping blocks interposed between said tie rod means and the outer surfaces of said screen plates, one for each of the edges of each of the screen plates resting upon the foot portions of said spanners to engage the edges of said screen plates and to clamp them upon said spanners as said tie rod means is tightened, and means on each of said clamping blocks extending circumferentially from said spanners and interposed between said tie rod means and the outer surfaces of said screen plates to further reinforce the plates between the clamping edges thereof.

JOHN A. TRAYLOR.